United States Patent
Kodama

(10) Patent No.: US 7,860,909 B2
(45) Date of Patent: Dec. 28, 2010

(54) SEARCH ENGINE SYSTEM USING SNAPSHOT FUNCTION OF STORAGE SYSTEM

(75) Inventor: Shoji Kodama, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 320 days.

(21) Appl. No.: 11/971,442

(22) Filed: Jan. 9, 2008

(65) Prior Publication Data

US 2009/0063422 A1   Mar. 5, 2009

(30) Foreign Application Priority Data

Sep. 5, 2007   (JP) .............................. 2007-229651

(51) Int. Cl.
  G06F 17/00   (2006.01)
(52) U.S. Cl. .................. 707/936; 707/640; 707/645
(58) Field of Classification Search ............. 707/639, 707/640, 645
  See application file for complete search history.

(56) References Cited

U.S. PATENT DOCUMENTS 7,624,241 B2 * 11/2009 Eguchi et al. ............... 711/162

FOREIGN PATENT DOCUMENTS

JP   63-080325   4/1988

OTHER PUBLICATIONS

Google Operating System, Get Fresh Search Results from Google, http://googlesystem.blogspot.com/2007/06/get-fresh-search-results-from-google.html.
"Web History" Function Added to Google; Making It Possible to Save/Search the History of Websites You Have Already Seen, http://internet.watch.impress.co.jp/cda/news/2007/04/20/15503.html.
Http://www.google.com/support/accounts/bin/answer. py?answer=54068&topic=10472, "What is Web History", Apr. 20, 2007, pp. 1-2.

* cited by examiner

Primary Examiner—Sana Al-Hashemi
(74) Attorney, Agent, or Firm—Brundidge & Stanger, P.C.

(57) ABSTRACT

The present invention relates a retrieving technology by using an index obtained at a specific time point and a rule obtained at a specific time point. The present invention provides a storage system includes: a first logical unit for storing an index; a second logical unit for storing a rule that defines how to output search results; a third logical unit for storing a snapshot of the index created based on a predetermined time; and a fourth logical unit for storing a snapshot of the rule created based on a predetermined time; a search engine server is configured to: search the index stored in the third logical unit with a keyword included in a search request for an index record; and output storage location information of a data object included in the extracted index record in an order according to the rule stored in the fourth logical unit.

4 Claims, 10 Drawing Sheets

0401

| SEARCH KEYWORD | "TREE OF HITACHI" | 0402 |
| --- | --- | --- |
| INDEX TIME | 2007/6/18 10:00 | 0403 |
| SCORING RULE TIME | 2007/6/19 8:00 | 0404 |
| SEARCH TARGET DATA TIME | 2007/6/18 10:00 | 0405 |

| REQUEST TYPE | CREATION | 1106 |
| --- | --- | --- |
| SNAPSHOT TIME | 2007/6/18 12:00 | 1107 |
| INDEX | NECESSARY | 1102 |
| SCORING RULE | UNNECESSARY | 1103 |
| SEARCH PROGRAM | NECESSARY | 1104 |
| SEARCH TARGET DATA | UNNECESSARY | 1105 |

| REQUEST TYPE | LIST DISPLAY | 1109 |

| REQUEST TYPE | DELETION | 1111 |
| --- | --- | --- |
| ID | 2 | 1112 |
| INDEX | NECESSARY | 1113 |
| SCORING RULE | UNNECESSARY | 1114 |
| SEARCH PROGRAM | NECESSARY | 1115 |
| SEARCH TARGET DATA | UNNECESSARY | 1116 |

FIG. 4C

| ID | SNAPSHOT TIME | INDEX | SCORING RULE | SEARCH PROGRAM | SEARCH TARGET DATA | CONSISTENCY GROUP |
|---|---|---|---|---|---|---|
| 1 | 2007/6/17 12:00 | LU001 | LU101 | LU201 | LU301 | CTG001 |
| 2 | 2007/6/17 24:00 | Null | Null | LU202 | Null | CTG002 |
| 3 | 2007/6/18 12:00 | LU002 | LU002 | LU203 | LU002 | CTG003 |
| 4 | 2007/6/18 24:00 | Null | Null | LU204 | Null | CTG004 |
| 5 | 2007/6/19 12:00 | LU003 | LU003 | LU205 | LU003 | CTG005 |
| 6 | 2007/6/19 24:00 | Null | Null | LU206 | Null | CTG006 |
| ⋮ | ⋮ | ⋮ | ⋮ | ⋮ | ⋮ | ⋮ |

*FIG. 5*

| SEARCH PROGRAM VERSION | UPDATE TIME | SUPPORTED FORMAT |
|---|---|---|
| Ver 001 | 2007/6/17 24:00 | Ver 001 |
| Ver 002 | 2007/6/18 24:00 | Ver 001  Ver 002 |
| Ver 003 | 2007/6/19 24:00 | Ver 002  Ver 003 |
| Ver 004 | 2007/6/20 24:00 | Ver 002  Ver 003  Ver 004 |
| ⋮ | ⋮ | ⋮ |

*FIG. 6*

SEARCH ENGINE SYSTEM USING SNAPSHOT FUNCTION OF STORAGE SYSTEM

CLAIM OF PRIORITY

The present application claims priority from Japanese patent application JP 2007-229651 filed on Sep. 5, 2007, the content of which is hereby incorporated by reference into this application.

BACKGROUND

This invention relates to a retrieval system for executing a data search processing.

JP 63-80325 A relates to an information retrieval method and an index, describing a technology in which a keyword included in search criteria preregistered by an operator and a keyword included in the index are compared with each other according to a predetermined logical conditional expression at a reserved search execution time preregistered by the operator, and update data having a keyword that satisfies the predetermined Boolean expression is retrieved, the update data having been updated after a previous search using the same search criteria as the current search.

In JP 63-80325 A, there is provided an index registered with a keyword and data update time regarding update data. When the data is updated, the update data is associated with the keyword and the data update time within the index. When the search is executed, the index is referenced to obtain the update data updated within a period specified for the search.

SUMMARY

In the retrieval system, the index is used to execute a search, and search results are outputted according to a scoring rule that defines how to output the search results. The index and the scoring rule may be newly added or changed. If there occurs a change of the index or the rule, there also occurs a change in search results provided to a searcher or the output order of search results. This leads to a demand for a technology in which the index obtained at a specific time point is used to execute a search processing, and the scoring rule obtained at a specific time point is used to display the search results.

According to an aspect of this invention, there is provided a retrieval system including a storage system for storing a plurality of data objects and a search engine server. The search engine server is coupled to the storage system, and retrieves a requested data object from among a plurality of data objects in accordance with a search request. The storage system includes: a first logical unit for storing an index having index records each of which is created for each of the data objects, and includes storage location information indicating where the data object is stored and a keyword list of at least one keyword included in the data object; a second logical unit for storing a rule that defines how to output search results; at least one third logical unit for storing a snapshot of the index created based on a given time; and at least one fourth logical unit for storing a snapshot of the rule created based on a given time. Upon reception of a search request, the search engine server mounts the third logical unit and the fourth logical unit based on the search request. After that, the search engine server searches the index stored in the mounted third logical unit with a keyword included in the search request for an index record whose keyword list includes the keyword. Further, the search engine server outputs the storage location information of the data object included in at least one extracted index record in an order according to the rule stored in the mounted fourth logical unit.

According to the representative embodiment of this invention, it is possible to execute a search processing by using a past index, and output the search results according to a past rule.

BRIEF DESCRIPTION OF THE DRAWINGS

The present invention can be appreciated by the description which follows in conjunction with the following figures, wherein:

FIG. 3 is an explanatory diagram showing an example of a search request issued to a search engine server by a client computer in accordance with the embodiment of this invention;

FIGS. 4A to 4C are explanatory diagrams showing examples of snapshot management requests issued to the search engine server by a management terminal in accordance with the embodiment of this invention;

FIG. 5 is an explanatory diagram showing an example of a snapshot management table in accordance with the embodiment of this invention;

FIG. 6 is an explanatory diagram showing an example of a search program version management table in accordance with the embodiment of this invention;

DETAILED DESCRIPTION OF THE PREFERRED EMBODIMENTS

Hereinafter, description will be made of an embodiment of this invention. It should be noted that this invention is not limited only to the embodiment described below.

Figure 1:
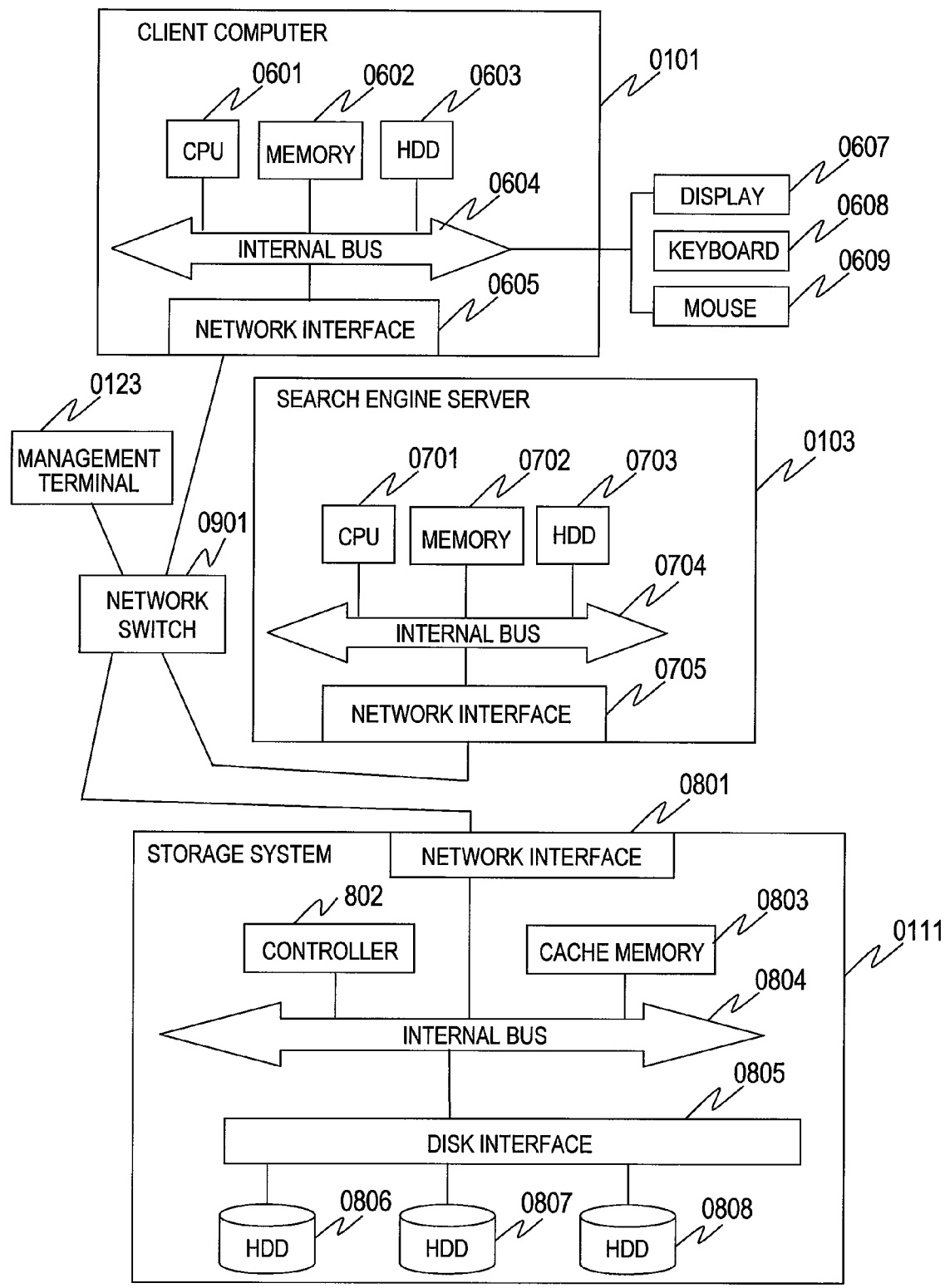
FIG. 1 is an explanatory diagram of a system configuration example of a retrieval system and a hardware configuration example of system configuration components that constitute the retrieval system in accordance with an embodiment of this invention.

FIG. 1 shows a system configuration example of a retrieval system and a hardware configuration example of system configuration components that constitute the retrieval system, according to the embodiment.

The retrieval system includes a client computer 0101, a search engine server 0103, a storage system 0111, a management terminal 0123, and a network switch 0901.

The client computer 0101 is a terminal used by a user for retrieving data. The client computer 0101 has the same hardware configuration as a general computer. In other words, the client computer 0101 includes a central processing unit (CPU) 0601, a memory 0602, a hard disk drive (HDD) 0603, and a network interface 0605, which are connected to one another through an internal bus 0604. Further connected to the client computer 0101 as user interfaces are a display 0607, a keyboard 0608, and a mouse 0609.

The search engine server 0103 is a server for processing a data search request received from the client computer 0101. The search engine server 0103 has the same hardware configuration as a general computer. In other words, the search engine server 0103 includes a CPU 0701, a memory 0702, an HDD 0703, and a network interface 0705, which are connected to one another through an internal bus 0704.

The storage system 0111 stores search target data. The storage system 0111 also has logical units (hereinafter, referred to as "LUs") each storing an index, a scoring rule, and a search engine program that are used by the search engine server 0103. The storage system 0111 includes a network interface 0801, a controller 0802 composed of a memory and a CPU, a cache memory 0803, a disk interface 0805, and a plurality of HDDs 0806, 0807, and 0808, which are connected to one another through an internal bus 0804 except the HDDs. The HDDs are connected to the disk interface 0805.

The management terminal 0123 is a general computer used by an administrator who manages the search engine server 0103. The management terminal 0123 has the same hardware configuration as the client computer 0101, description of which will be omitted.

The client computer 0101, the search engine server 0103, the storage system 0111, and the management terminal 0123 have their own network interfaces as described above. Those network interfaces are connected to the network switch through a network cable, and can therefore communicate one another. For example, it is possible to use an Ethernet (registered trademark) as a network among the client computer 0101, the search engine server 0103, the storage system 0111, and the management terminal 0123, and TCP/IP as a communication protocol.

Figure 2:
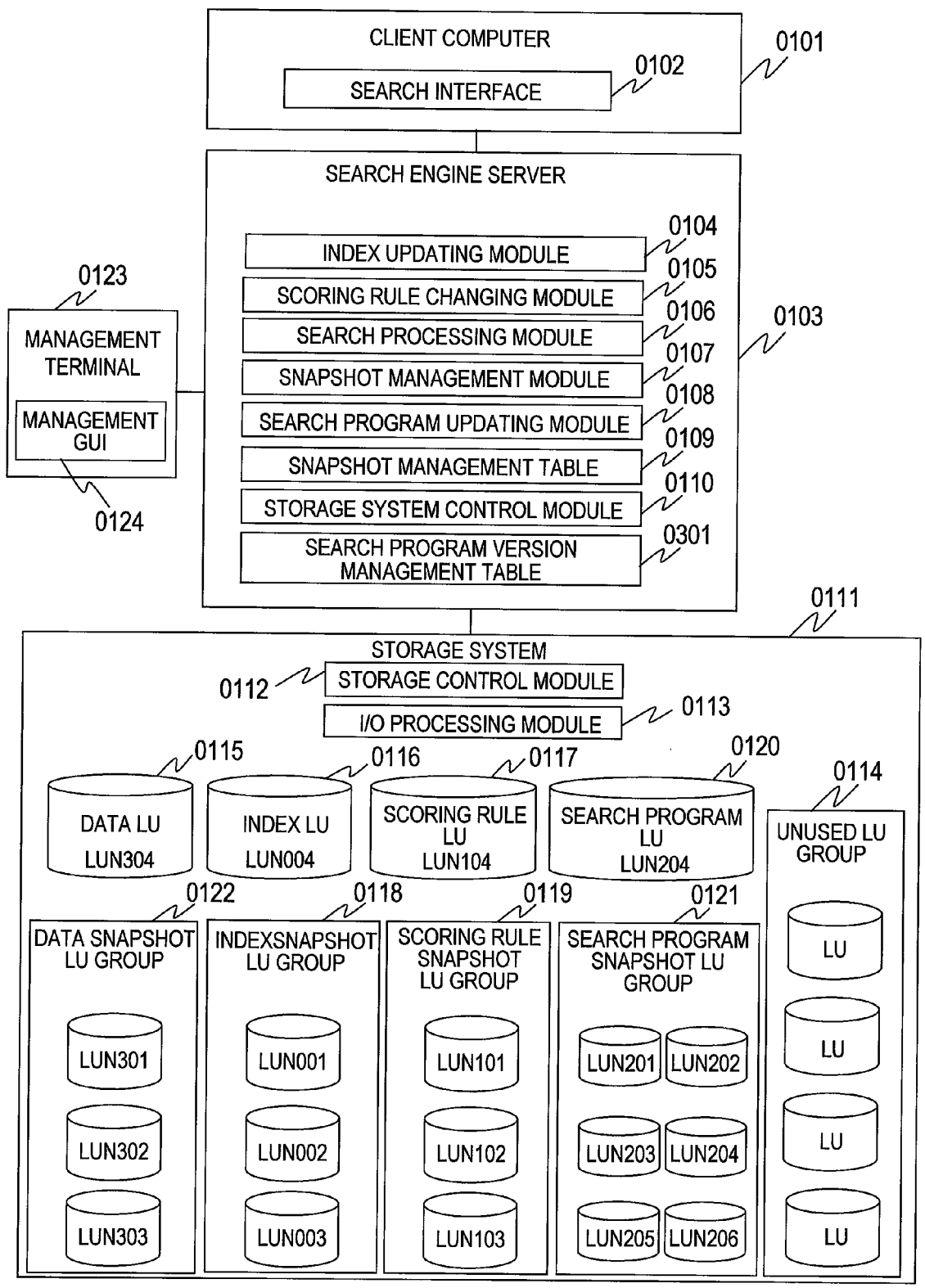
FIG. 2 is an explanatory diagram showing an example of a logical system configuration of the retrieval system and an example of functions provided by components of the system configuration in accordance with the embodiment of this invention.

FIG. 2 shows an example of a logical system configuration of the retrieval system and an example of functions provided by components of the system configuration. Hereinafter, description will be made of the functions of configuration components.

The storage system 0111 provides a storage control module 0112 and an I/O processing module 0113 as its functions. It should be noted that those functions of the storage system 0111 are provided by having the CPU of the controller 0802 execute programs stored in the memory of the controller 0802 or in the HDDs 0806, 0807, and 0808.

The storage system 0111 also has a plurality of LUs. Examples of the plurality of LUs include a data LU 0115 for storing the search target data, an index LU 0116 for storing an index that is created by the search engine server 0103 and used for the search, a scoring rule LU 0117 for storing a scoring rule that is used when the search engine server 0103 provides a search result to the client computer 0101, and a search program LU 0120 for storing a search program that is used when the search engine server 0103 executes a search processing. The LU represents a logical storage space defined in a storage medium such as a hard disk drive, and is identified by a logical unit number (LUN). The above-mentioned data LU 0115, index LU 0116, scoring rule LU 0117, and search program LU 0120 are mounted into the search engine server 0103, and data within those LUs are updated in response to an instruction from the search engine server 0103.

The storage system 0111 also includes: a data snapshot LU group 0122 including at least one data snapshot LU for storing a snapshot, which is a data image created at a given time instant, of data stored in the data LU 0115; an index snapshot LU group 0118 including at least one index snapshot LU for storing the snapshot of data stored in the index LU 0116; a scoring rule snapshot LU group 0119 including at least one scoring rule snapshot LU for storing the snapshot of data stored in the scoring rule LU 0117; a search program snapshot LU group 0121 including at least one search program snapshot LU for storing the snapshot of data stored in the search program LU 0120. The storage system 0111 further includes an unused LU group 0114 formed of at least one unused LU.

The storage control module 0112 receives various requests from a storage system control module 0110 on the search engine server 0103, and executes response regarding such an unused LU list as described later in response to the request, creation and deletion of a pair, and creation and deletion of a snapshot.

The I/O processing module 0113 processes an I/O request for data within the LU from the search engine server 0103 or another server.

The client computer 0101 provides a search interface 0102 as its function. The search interface 0102 provides the user with an input screen for inputting a search request and an output screen for displaying the search result received from the search engine server 0103. The client computer 0101 also has a function of issuing a search request to the search engine server 0103, and obtaining the search result. It should be noted that those functions of the client computer 0101 are provided by having the CPU 0601 execute programs stored in the memory 0602 or in the HDD 0603.

FIG. 3 shows a search request 0401, which is an example of the search request issued to the search engine server 0103 by the client computer 0101.

The search request 0401 contains a search keyword 0402, an index time 0403, a scoring rule time 0404, and a search target data time 0405. The index time 0403, the scoring rule time 0404, and the search target data time 0405 may be omitted. Specified as the search keyword 0402 is a keyword to be used for a search. Specified as the index time 0403 is the time of an index to be used for the search. Specified as the scoring rule time 0404 is the time of a scoring rule to be used for the search. Specified as the search target data time 0405 is the time of search target data to be referenced by the client computer 0101. Address information to be outputted as the search result is linked with the search target data selected based on the search target data time 0405.

Referring to FIG. 2 again, the management terminal 0123 provides a management graphical user interface (GUI) 0124. Upon reception of an instruction from the administrator, the management GUI 0124 instructs the search engine server 0103 via the network to change the scoring rule, update the search program, create a snapshot, display a list of snapshots, delete a snapshot, or perform other such process.

To instruct the search engine server 0103 to change the scoring rule, the management GUI 0124 transmits a new scoring rule to the search engine server 0103. To instruct the search engine server 0103 to update the search program, the management GUI 0124 transmits a new search program to the search engine server 0103.

FIGS. 4A to 4C are explanatory diagrams showing examples of a snapshot creation request 1101, a snapshot list display request 1108, and a snapshot deletion request 1110, respectively, which are issued to the search engine server 0103 by the management terminal 0123 to instruct the search engine server 0103 to create a snapshot, to display a list of snapshots, and to delete a snapshot, respectively. Hereinafter those three requests are collectively called a snapshot management request.

Specified in the snapshot creation request 1101 based on an instruction issued by the administrator through the management GUI, as shown in FIG. 4A, are a request type 1106, a snapshot time 1107, a snapshot creation necessity 1102 for an index, a snapshot creation necessity 1103 for a scoring rule, a snapshot creation necessity 1104 for a search program, and a snapshot creation necessity 1105 for search target data. The request type 1106 is specified as "creation". The snapshot time 1107 is specified with a time based on which the snapshot is to be created. If the snapshot time 1107 is not specified, a snapshot is created based on an arbitrary timing that is predetermined for the search engine server 0103. The snapshot creation necessity 1102, 1103, 1104, and 1105 for an index, a scoring rule, a search program, and search target data, respectively, are each specified with "necessary" when the corresponding snapshot needs to be created and "unnecessary" when the corresponding snapshot does not need to be created. The search engine server 0103 performs such control that only the snapshot of data with the snapshot creation necessity specified with "necessary" is obtained, and registers where the obtained snapshot is stored in a snapshot management table 0109 shown in FIG. 5, which will be described later.

As shown in FIG. 4B, the snapshot list display request 1108 has a request type 1109 specified as "list display". In response to the snapshot list display request 1108, the management terminal 0123 obtains from the search engine server 0103 a list of the snapshots registered in the snapshot management table 0109 described later, and displays the list on the management GUI.

Specified in the snapshot deletion request 1110, as shown in FIG. 4C, are a request type 1111, an ID 1112, a snapshot deletion necessity 1113 for an index, a snapshot deletion necessity 1114 for a scoring rule, a snapshot deletion necessity 1115 for a search program, and a snapshot deletion necessity 1116 for search target data. The request type 1111 is specified as "deletion". The ID 1112 is specified with an ID that identifies a snapshot group to which the snapshot to be deleted belongs. The term "ID" used herein represents a unique identification that indicates at least one snapshot obtained based on the same time, in other words, a snapshot group. The snapshot deletion necessities 1113, 1114, 1115, and 1116 for an index, a scoring rule, a search program, search target data, respectively, are each specified with "necessary" when the corresponding snapshot needs to be deleted and "unnecessary" when the corresponding snapshot does not need to be deleted. The search engine server 0103 performs such control that only the snapshot of data with the snapshot deletion necessity specified with "necessary" is deleted, and erases the LUN of the deleted snapshot from the snapshot management table 0109 shown in FIG. 5, which will be described later.

Referring to FIG. 2 again, the search engine server 0103 provides its functions an index updating module 0104, a scoring rule changing module 0105, a search processing module 0106, a snapshot management module 0107, a search program updating module 0108, and the storage system control module 0110. The search engine server 0103 also has the snapshot management table 0109 and a search program version management table 0301, which are used by the search engine server 0103 to provide the above-mentioned functions. It should be noted that those functions of the search engine server 0103 are provided by having the CPU 0701 execute programs stored in the memory 0702 or in the HDD 0703.

FIG. 5 shows an example of the snapshot management table 0109. The snapshot management table 0109 has an ID column 0207, a snapshot time column 0202, an index column 0203, a scoring rule column 0204, a search program column 0205, a search target data column 0206, and a consistency group column 0208. Registered in the ID column 0207 is an ID assigned to a snapshot group formed of at least one snapshot that is created based on the same time. Registered in the snapshot time column 0202 is a time based on which the snapshot is created. Registered in the index column 0203 is the LUN of an LU within the storage system 0111 in which the snapshot of data within the index LU 0116 is stored. Registered in the scoring rule column 0204 is the LUN of an LU within the storage system 0111 in which the snapshot of data within the scoring rule LU 0117 is stored. Registered in the search program column 0205 is the LUN of an LU within the storage system 0111 in which the snapshot of data within the search program LU 0120 is stored. Registered in the search target data column 0206 is the LUN of an LU within the storage system 0111 in which the snapshot of data within the search target data LU 0115 is stored. Registered in the consistency group column 0208 is an identifier indicating a set of LUs that store at least one snapshot obtained based on the same time.

FIG. 6 shows an example of the search program version management table 0301. The search program version management table 0301 has a search program version column 0302, an update time column 0303, and a supported format 0304. The search program version management table 0301 is updated when a search program is upgraded and stored in the search program LU 0120 of the storage system 0111. Registered in the search program version column 0302 is information on the version of the search program. Registered in the update time column 0303 is information that indicates a time at which the search program is updated, in other words, a time at which a new version of the search program is stored in the search program LU 0120 of the storage system 0111. Registered in the supported format column 0304 is information that indicates a recording manner, in other words, format, for the index and the scoring rule which is supported by the newly installed search program. For example, in a record with "Ver002" in the search program version column 0302, the supported format is specified as "Ver001, Ver002". This indicates that the search program of Ver002 supports a format of Ver002 that can be interpreted by itself and a format of Ver001 which is the latest version that can be interpreted by the search program of Ver001. In a similar manner, in a record with "Ver004" in the search program version column 0302, the supported format is specified as "Ver002, Ver003, Ver004". This indicates that the search program of Ver004 supports a format of Ver004 that can be interpreted by itself, a format of Ver003 which is the latest version that can be interpreted by the search program of Ver003, and the format of Ver002 which is the latest version that can be interpreted by the search program of Ver002, and does not support the format of Ver001.

Referring to FIG. 2 again, the storage system control module 0110 performs a function for the search engine server 0103 to control the storage system 0111, and executes a search through the storage system 0111 for an unused LU, creation and deletion of a pair, creation and deletion of a snapshot, and the like. The pair defines a combination of LUs serving as a copy source and a copy destination when data within a given LU is copied to another LU.

Based on a schedule set in advance by an administrator of the search engine server 0103, the index updating module 0104 creates a new index after performing a crawl of the search target data stored in the data LU 0115 of the storage system 0111, in other words, reading timestamps of the whole search target data to check if the data is updated or not. The created index is stored in the index LU 0116 of the storage system 0111. Thus, the index is updated.

Figure 7:
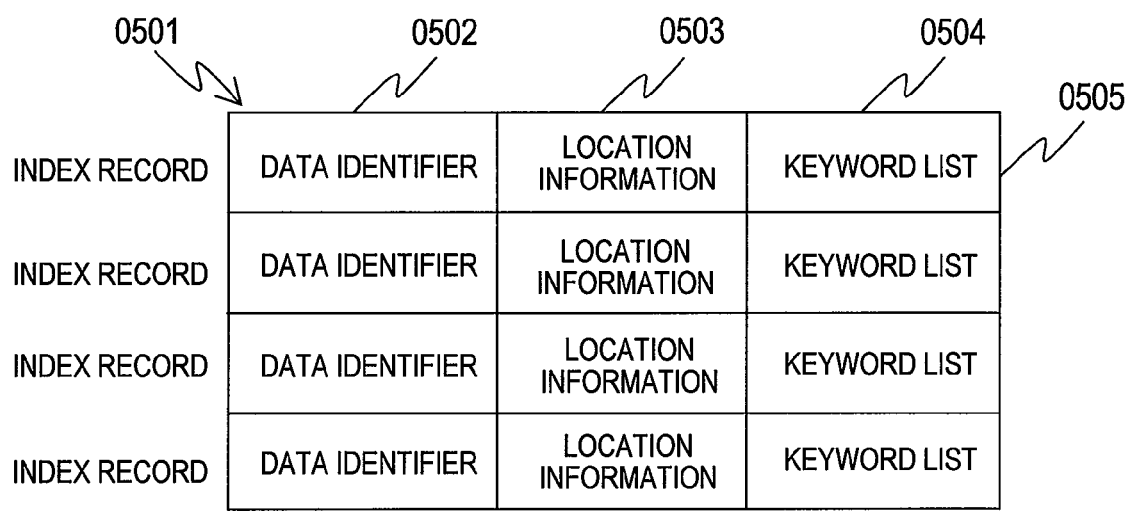
FIG. 7 is an explanatory diagram showing an example of an index in accordance with the embodiment of this invention.

FIG. 7 shows an example of an index 0501. The index 0501 contains a plurality of index records 0505. The index records 0505 exist in correspondence with respective data objects contained in the search target data. Examples of the data object include a file within a file system. Each of the index records 0505 contains a data identifier 0502 for uniquely identifying a data object, location information 0503 that indicates a location where the data object is stored, and a keyword list 0504 that is a list of keywords contained in the data object. The data identifier 0502 is added to each data object when the index updating module 0104 performs a crawl of the search target data. The location information 0503, in other words, address information, of a data object represents address information used to access the data object. For example, the location information 0503 can be described as a name of a file server, a name of a shared folder within the filer server, a path name within the shared folder, and a file name. Further, the index updating module 0104 references contents of each data object during the crawl of the data, and extracts keywords therefrom according to a predetermined rule, to thereby create the keyword list 0504.

Referring to FIG. 2 again, the scoring rule changing module 0105 updates the scoring rule stored in the scoring rule LU 0117 of the storage system 0111 into a new scoring rule in response to a request from the management terminal 0123. Examples of the scoring rule include the rule "count the search keywords contained in the data object and sort the search results in descending order of the score".

The search processing module 0106 performs a search in response to the search request 0401 from the client computer 0101, creates a search result that contains the location information 0503 of the data object, and returns the search result to the client computer 0101.

The snapshot management module 0107 receives the snapshot management request from the management terminal 0123, and performs creation of a snapshot, list display of snapshots, and deletion of the snapshot in accordance with the request type.

Based on the instruction to update a search program from the management terminal 0123, the search program updating module 0108 installs a new search program onto the search engine server 0103 to upgrade the search program.

Figure 8A:
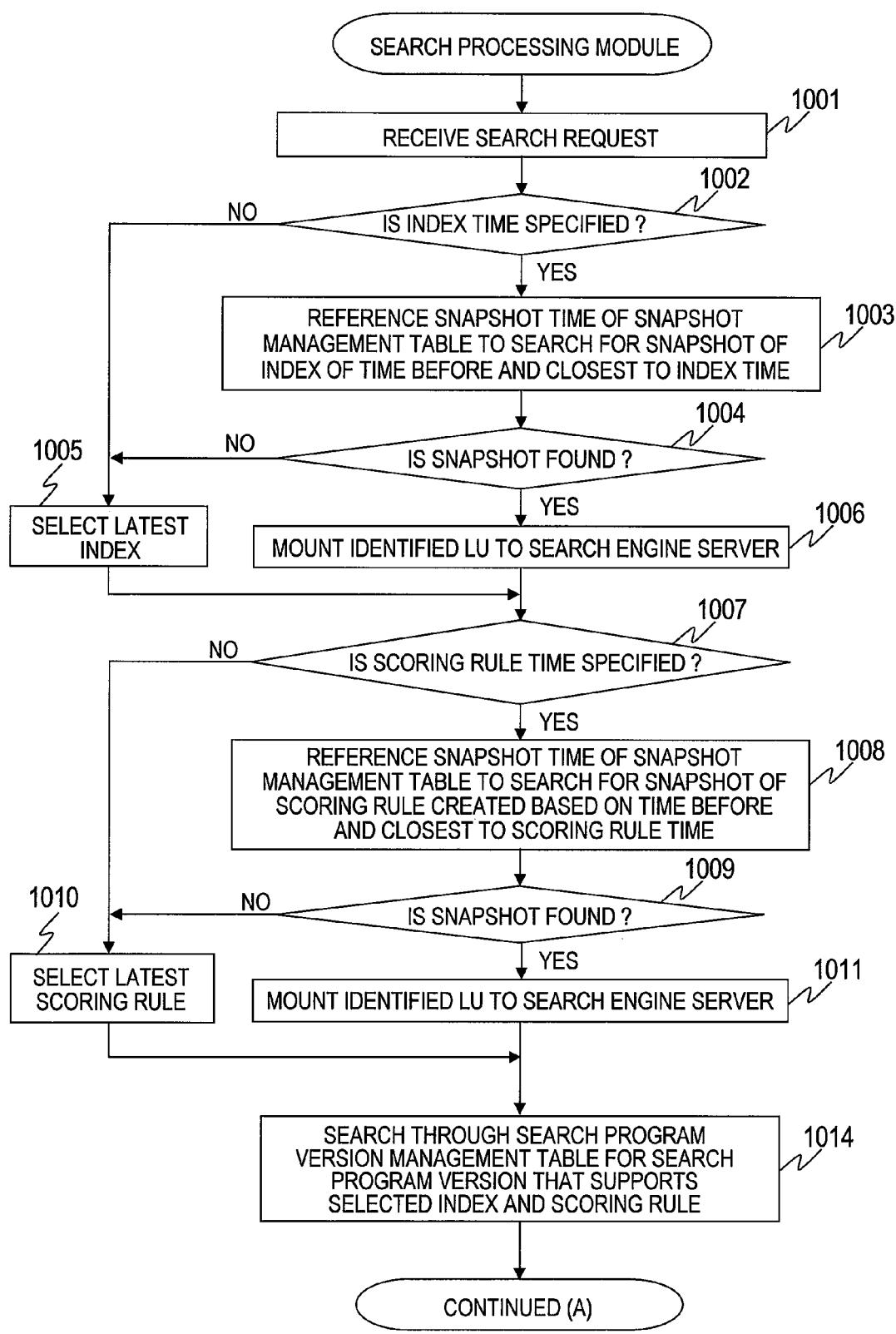
FIG. 8A is an explanatory diagram showing an example of a processing flow of a search processing module in accordance with the embodiment of this invention.
Figure 8B:
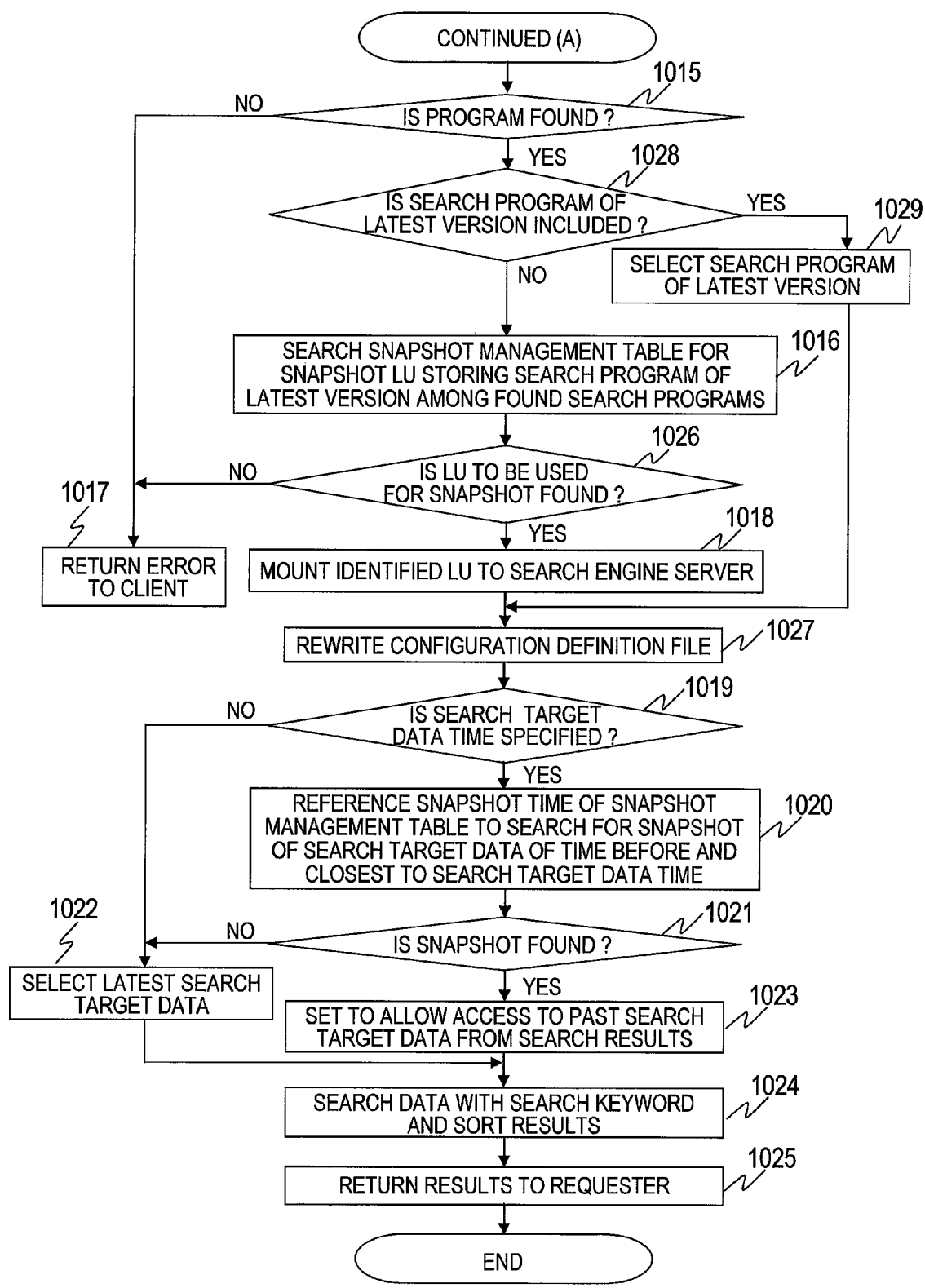
FIG. 8B is another explanatory diagram showing the example of the processing flow of the search processing module in accordance with the embodiment of this invention.

FIGS. 8A and 8B show an example of a processing flow of the search processing module 0106.

In Step 1001, the search processing module 0106 receives the search request 0401 shown in FIG. 3 from the client computer 0101.

In Step 1002, the search processing module 0106 checks what is specified in the index time 0403 of the search request 0401 to confirm whether or not the index time 0403 is specified with any index time. If the index time 0403 is not specified, the processing advances to Step 1005, and the search processing module 0106 selects the index LU 0116 of the storage system 0111 for use in a search of the latest index. It should be noted that the index LU 0116 of the storage system 0111 in which the latest index is stored is already mounted to the search engine server 0103 as described above.

If the index time 0403 is specified, in Step 1003, the search processing module 0106 references the snapshot management table 0109 to perform a search and confirm whether or not the snapshot 0203 of an index created based on a time before and closest to a specified index time exists.

If the snapshot does not exist, in Step 1005, the search processing module 0106 selects the index LU 0116 of the storage system 0111 for use in a search of the latest index.

If the snapshot exists, in Step 1006, the search processing module 0106 mounts the LU of the storage system 0111 storing the identified snapshot to the search engine server 0103 so as to be able to execute the search processing by using the index corresponding to the specified time.

Subsequently, in Step 1007, the search processing module 0106 checks what is specified in the scoring rule time 0404 of the search request 0401 to check whether or not the scoring rule time 0404 is specified with any scoring rule time. If the scoring rule time 0404 is not specified, the processing advances to Step 1010, and the search processing module 0106 selects the scoring rule LU 0117 of the storage system 0111 in order to decide the output order of the search results by using the latest scoring rule. It should be noted that the scoring rule LU 0117 of the storage system 0111 in which the latest scoring rule is stored is already mounted to the search engine server 0103 as described above.

If the scoring rule time 0404 is specified, in Step 1008, the search processing module 0106 references the snapshot management table 0109 to perform a search and confirm whether or not the snapshot 0204 of a scoring rule created based on a time before and closest to a specified scoring rule time exists.

If the snapshot does not exist, in Step 1010, the search processing module 0106 selects the scoring rule LU 0117 of the storage system 0111 in order to decide the output order of the search results by using the latest scoring rule.

If the snapshot exists, in Step 1011, the search processing module 0106 mounts the LU of the storage system 0111 storing the identified snapshot to the search engine server 0103 so as to be able to output the search results by using the scoring rule corresponding to the specified time.

After selecting the index and the scoring rule that are to be used for the search and the display of the search results, in Step 1014, the search processing module 0106 searches the search program version management table 0301 for the search program version that can interpret, in other words, support, the format of the selected index and scoring rule.

A specific example thereof will be described. As shown in FIG. 3, the search request 0401 has the index time 0403 specified with "2007/6/18 10:00" and the scoring rule time specified with "2007/6/19 8:00". In this case, the search processing module 0106 references the search program version management table 0301 of FIG. 6 to perform a search for the search program having the update time 0303 before and closest to the index time, thereby identifying the search program of Ver001. In a similar manner, the search processing module 0106 performs a search for the search program having the update time 0303 before and closest to the scoring rule time, thereby identifying the search program of Ver002. Then, the supported formats of the search program versions are checked and compared with each other, thereby identifying the version "Ver001" that supports both the index and scoring rule of the specified time.

In Step 1015, the search processing module 0106 checks whether or not the search program that supports both the selected index and scoring rule is identified. If the search program is not identified, in Step 1017, the search processing module 0106 returns an error to the client computer 0101. There may be adopted another embodiment in which, instead of returning an error, the search processing module 0106 searches for the search program that supports both the selected index and scoring rule until the search program is found by selecting another combination of the index and the scoring rule of times that appear even farther from the specified times of the search request.

If the search program is identified in Step 1015, in Step 1028, the search processing module 0106 checks whether or not at least one identified search program includes the search program of the latest version. If the identified search program includes the search program of the latest version, in Step 1029, the search processing module 0106 selects the search program of the latest version as the search program to be used for the search processing. It should be noted that the search program LU 0120 in which the search program of the latest version is stored is already mounted to the search engine server 0103, so the processing advances to Step 1027.

If the at least one identified search program does not include the search program of the latest version, in Step 1016, the search processing module 0106 selects the search program of the latest version from among the identified search programs, and searches the snapshot management table 0109 for an LU of the storage system 0111 which stores the selected search program. In other words, the search processing module 0106 identifies an LU storing the snapshot of the search program obtained based on the snapshot time 0202 that is the same as the update time 0303 of the selected search program.

In Step 1026, the search processing module 0106 checks whether or not the LU is found. If the LU is not found, in Step 1017, the search processing module 0106 returns an error to the client computer 0101.

If the LU is found, in Step 1018, the search processing module 0106 mounts the identified LU to the search engine server 0103.

In Step 1027, in order to allow the search program to use the specified index and scoring rule, the search processing module 0106 rewrites a configuration definition file of the search program. The configuration definition file represents a file for specifying the LUN of the LU storing the index and scoring rule used by the search program. It should be noted that there exists a search program whose configuration definition file cannot be rewritten. In this case, the search processing module 0106 executes virtual server software on the search engine server 0103 to separately launch a virtual search engine server, and performs such setting that the virtual search engine server can use the LU storing the specified index and scoring rule.

In Step 1019, the search processing module 0106 checks whether or not the search target data time is specified within the search request. If the search target data time is not specified, the processing advances to Step 1022, the search processing module 0106 provides the client computer 0101 with access to the latest search target data stored in the data LU 0115 within the storage system 0111.

If the search target data time is specified, in Step 1020, the search processing module 0106 refers the snapshot management table 0109 to perform a search the snapshot 0206, and to judge whether or not the snapshot 0206 of search target data created based on a time before and closest to a specified search target data time exists.

If the snapshot does not exist in Step 1021, the processing advances to Step 1022, the search processing module 0106 provides the client computer 0101 with access to the latest search target data stored in the data LU 0115 within the storage system 0111.

If the snapshot exists, in Step 1023, the search processing module 0106 mounts the LU of the storage system 0111 storing the identified snapshot to the search engine server 0103 so as to allow the client computer 0101 to access the past search target data corresponding to the time specified in the search request. For example, if the data object is in a file format, the client computer 0101 may be allowed to access the corresponding volume by making the volume public by use of a file sharing mechanism such as a network file system (NFS).

In Step 1024, the search processing module 0106 launches the search program that is stored in the LU mounted in Step 1018 or the search program of the latest version selected in Step 1029, and executes the program in which the search keyword 0402 specified in the search request is used to search the keyword list 0504 within the index selected in Step 1005 or 1006, and when there is a hit, the corresponding data object is extracted. Subsequently, the search processing module 0106 calculates the score by using the scoring rule selected in Step 1010 or 1011 for each data object found as a result of the search, and creates search results in which the data objects are sorted on their location information 0503 in ascending order of the scores.

In Step 1025, the search processing module 0106 outputs the search results to the client computer 0101 and ends the processing. The client computer 0101 displays the search results on the display 0607. Upon reception of an access request for access to a data object which is made based on the search results by a searcher, the client computer 0101 transmits the access request to the search engine server 0103. The search engine server 0103 that has received the access request accesses the latest search target data if the latest search target data is selected in Step 1022. If the past search target data is selected in Step 1023, the search engine server 0103 accesses the past search target data because the location information 0503 indicating the storage location of the data object which is outputted in the search results is set to correspond to the storage location of the past search target data.

Figure 9:
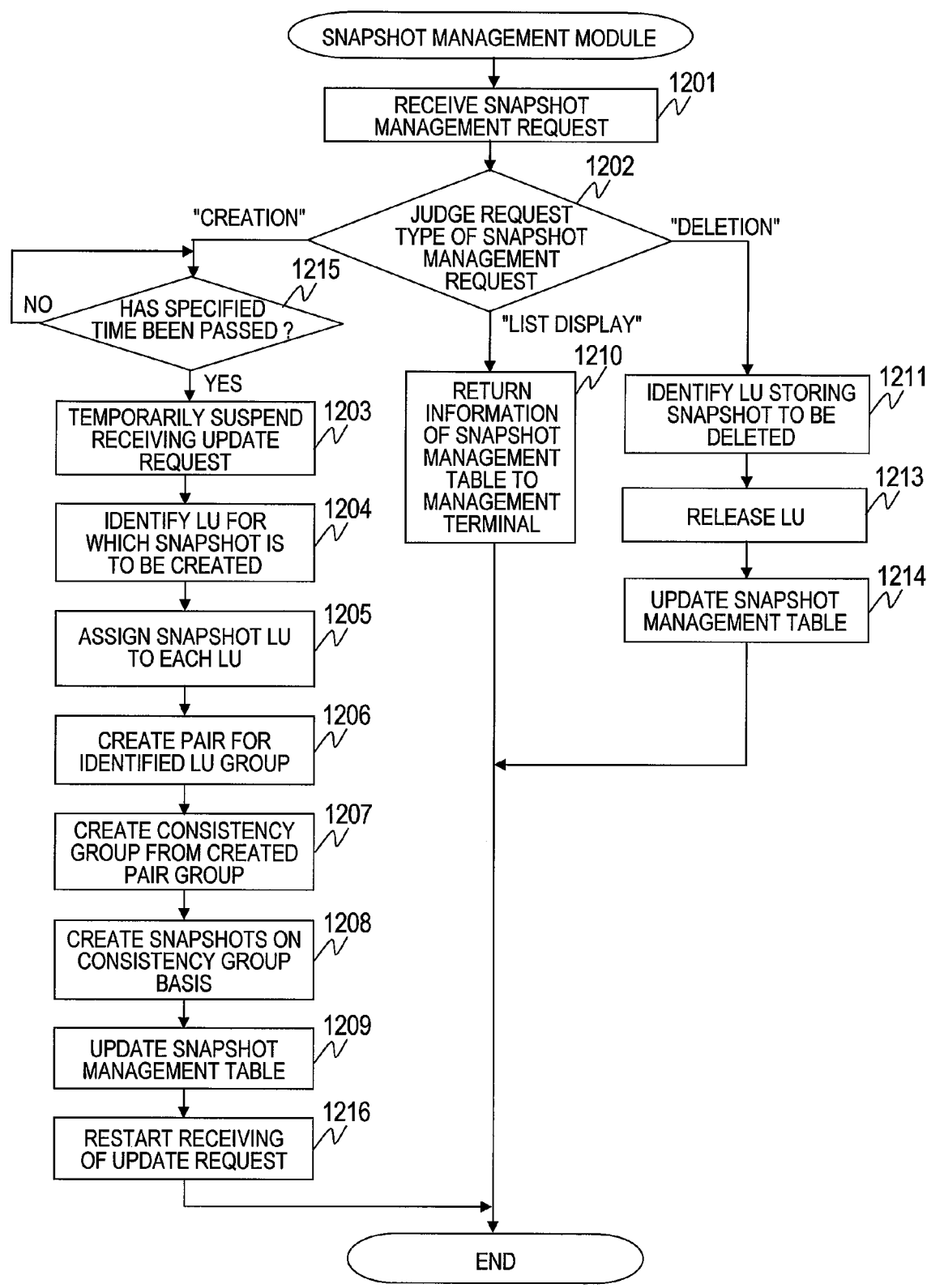
FIG. 9 is an explanatory diagram showing an example of a processing flow of a snapshot management module in accordance with the embodiment of this invention.

FIG. 9 shows an example of a processing flow of the snapshot management module 0107.

In Step 1201, the snapshot management module 0107 receives a snapshot management request from the management terminal 0123.

In Step 1202, the snapshot management module 0107 references the request type of the snapshot management request to judge which request has been made. The request type includes "creation" 1106, "list display" 1109, and "deletion" 1111.

Hereinafter, description will be made of a case of the request type specified as "creation".

In Step 1215, the snapshot management module 0107 references the snapshot time 1107 within the snapshot creation request 1101 to judge whether or not the current time has passed the snapshot time 1107. The judgment of Step 1215 is repeated until the result is "Yes".

If the snapshot time 1107 has been passed, in Step 1203, the snapshot management module 0107 temporarily suspends receiving of the instruction to change the scoring rule or the instruction to update the search program, while suppressing the start of a new index update processing performed by the index updating module 0104. It should be noted that the snapshot management module 0107 waits for the completion of the update processing if updating of the index, the scoring rule, or the search program is already underway. Further, the snapshot management module 0107 instructs the storage control module 0112 to suspend the updating of the search target data, and waits for a notification of completed suspension from the storage control module 0112. According to the instruction from the snapshot management module 0107, the storage control module 0112 suspends receiving of a new request for updating of the search target data, and if the search target data is already being updated, waits for the completion of the updating processing and notifies the snapshot management module 0107 of completed suspension. Accordingly, the scoring rule, the search target data, the search program, or the index is not updated during the snapshot creation, which makes it possible to obtain an image by snapshot with the times being synchronous among the index, the scoring rule, the search target data, and the search program.

In Step 1204, the snapshot management module 0107 references the snapshot creation request 1101 to identify the data whose snapshot is to be obtained. To be specific, as shown in FIG. 4A, in each of the index 1102, the scoring rule 1103, the search program 1104, and the search target data 1105 of the snapshot creation request, it is specified whether or not snapshot needs to be created. Further, the index 1102, the scoring rule 1103, the search program 1104, and the search target data 1105 of the copy source are stored in mutually different LUs, and snapshots are created on an LU basis, so the snapshot management module 0107 identifies at least one LU for which a snapshot is to be created.

In Step 1205, the snapshot management module 0107 selects a snapshot LU for storing the snapshot of each identified LU from the unused LU group 0114. At this time, the snapshot management module 0107 uses the storage system control module 0110 to obtain the list of unused LUs from the storage system 0111 and selects an LU therefrom.

In Step 1206, the snapshot management module 0107 uses the storage system control module 0110 to create a pair of each LU identified in Step 1204 as a copy source and a snapshot LU assigned to the corresponding LU in Step 1205 as a copy destination. By creating the pair, it is defined data of which LU is copied to which LU. It should be noted that a plurality of pairs are created if there exist a plurality of LUs whose snapshots are to be created. Hereinafter, at least one pair created in Step 1206 is called a pair group.

In Step 1207, the snapshot management module 0107 uses the storage system control module 0110 to create a consistency group so that the pair group belongs to a single consistency group. In creation thereof, the snapshot management module 0107 decides a name of the consistency group. The consistency group represents a plurality of snapshot groups obtained based on the same time.

In Step 1208, the snapshot management module 0107 uses the storage system control module 0110 to create snapshots on a consistency group 0208 basis. Hereinafter, specific description will be made of a snapshot creation processing. First, the storage system control module 0110 instructs the storage control module 0112 to store all the data existing in the cache memory within the storage system 0111, in the LU. Then, the storage system control module 0110 instructs the storage control module 0112 to copy data for each pair belonging to a consistency group from a copy source LU to a copy destination LU that forms the pair with the copy source LU. If the copying is complete, the pair is deleted, in other words, a relationship between the copy source and the copy destination is canceled. As a result, the copy destination LU becomes the LU storing the snapshot.

In Step 1209, the snapshot management module 0107 adds a new entry to the snapshot management table 0109, and assigns a new ID to at least one snapshot newly created. In the snapshot management table 0109, the snapshot management module 0107 records the snapshot time used as a basis of the judgment of Step 1216 in the snapshot time column 0202, the LUNs assigned to the LUs storing the snapshots in the index column 0203, the scoring rule column 0204, the search program column 0205, and the search target data column 0206, and the name of the consistency group decided in Step 1207 in the consistency group column 0208.

Finally in Step 1216, the snapshot management module 0107 restarts the receiving of the instruction to change the scoring rule, the instruction to update the search target data, the instruction to update the search program, and the instruction to update the index, thereby completing the snapshot creation processing.

Returning to Step 1202, description will be made of a case of the request type specified as "file display".

In Step 1210, the snapshot management module 0107 references the snapshot management table 0109 to transmit the information stored in the table to the management terminal 0123, which ends the processing.

The list display request 1108 is used, for example, to delete a snapshot, in other words, when it is confirmed whether or not the snapshot exists, and it is decided whether or not each snapshot needs to be deleted.

Returning to Step 1202, description will be made of a case of the request type specified as "deletion".

In Step 1211, the snapshot management module 0107 references the specifications of the snapshot deletion request, in other words, the ID 1112, the snapshot deletion necessity 1113 for the index, the snapshot deletion necessity 1114 for the scoring rule, the snapshot deletion necessity 1115 for the search program, and the snapshot deletion necessity 1116 for the search target data, and also references the snapshot management table 0109 to identify the LU within the storage system 0111 which stores the snapshot requested to be deleted.

In Step 1213, the snapshot management module 0107 releases the LU identified in Step 1211, in other words, brings the LU into an unused state. As a result, the LU belongs to the unused LU group 0114.

In Step 1214, the snapshot management module 0107 deletes the LUN of the LU identified in Step 1211 from the snapshot management table 0109. If all the snapshots of the index, the scoring rule, the search target data, and the search program are deleted, the corresponding entry is deleted entirely.

The above-mentioned steps complete the snapshot deletion processing.

Figure 10:
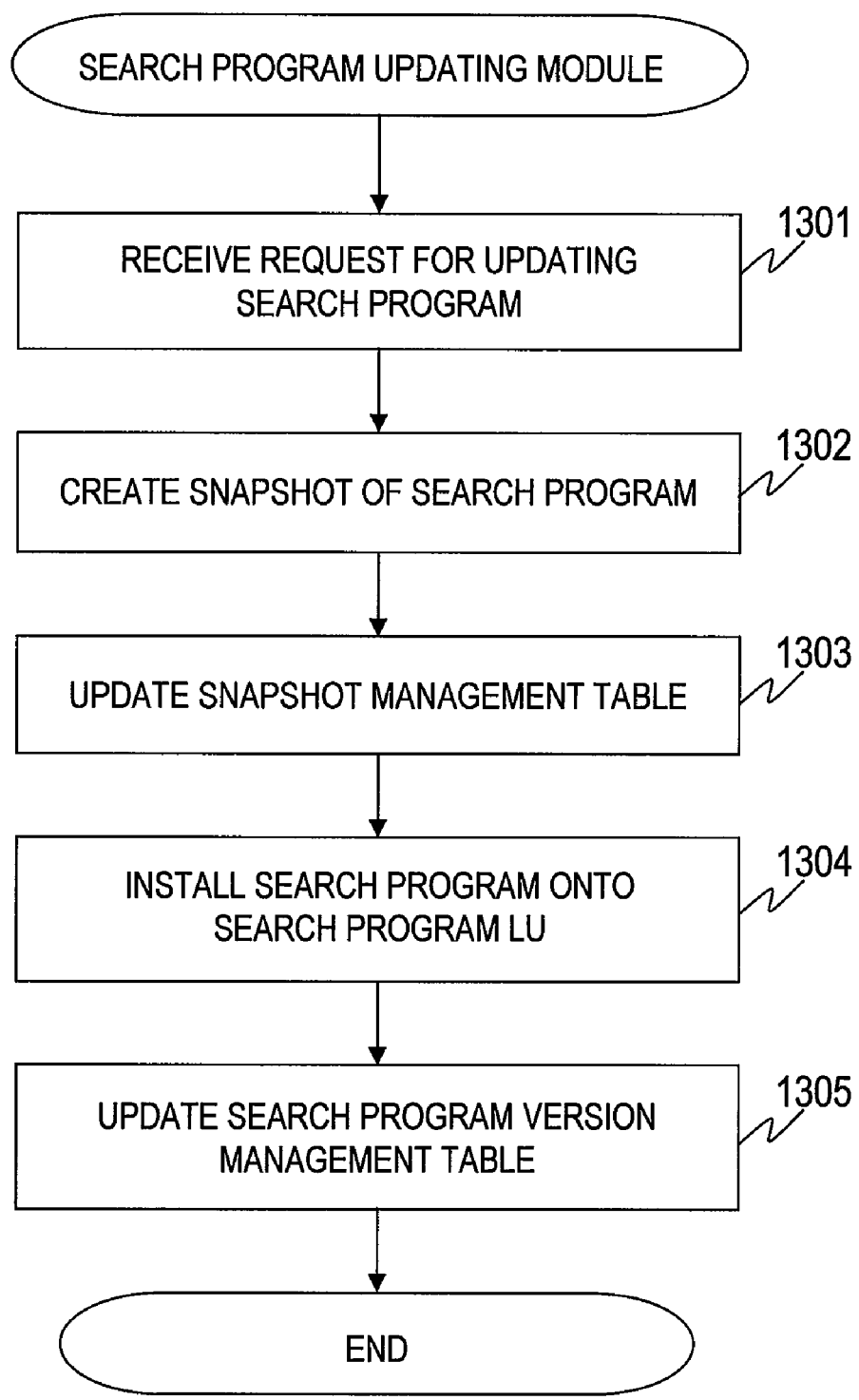
FIG. 10 is an explanatory diagram showing an example of a processing flow of a search program updating module in accordance with the embodiment of this invention.

FIG. 10 shows an example of a processing flow of the search program updating module 0108.

In Step 1301, the search program updating module 0108 receives an instruction to update a search program from the management terminal 0123.

In Step 1302, the snapshot management module 0107 uses the storage system control module 0110 to create a snapshot of the search program that is currently being used. In other words, the snapshot management module 0107 assigns a snapshot LU to the LU 0120, creates a pair, copies data from the copy source LU 0120 to the copy destination LU, and then deletes the pair.

In Step 1303, the search program updating module 0108 adds an entry for managing the snapshot of the created search program to the snapshot management table. To be specific, the search program updating module 0108 assigns the ID 0207, records the snapshot time 0202 at which the snapshot is created, and also records the LUN of the LU storing the snapshot.

In Step 1304, the search program updating module 0108 installs the received new search program onto the search program LU 0120.

In Step 1305, the search program updating module 0108 updates the search program version management table 0301. To be specific, the search program updating module 0108 records the search program version 0302 and the version of the format of the index and scoring rule which is supported by the search program. The version of the format that can be supported is contained in the instruction to update a search program transmitted from the management terminal 0123.

The above-mentioned steps complete the processing performed by the search program updating module 0108.

As described above, according to this embodiment, it is possible to perform a search of data by using a past index, and output the search results according to the scoring rule.

Accordingly, by using the index and the scoring rule of a given time instant, the searcher can reproduce the results of the search performed in the past, and can therefore find the data accessed in the past again with ease.

In addition, by using the scoring rules of a plurality of time instants to output the results of the search using the index of a specific time instant, it is possible to presume details of changes in the scoring rule.

Further, the searcher can be allowed to reference the search target data of a past time instant based on the search results. This increases the probability that the searcher can find the data accessed in the past again and access the data.

In the above embodiment, the snapshot management module 0107 executes the snapshot obtaining processing with the reception of the snapshot creation request 1101 as a trigger. However, the snapshot obtaining processing may be executed with another timing as a trigger. For example, the snapshot may be created each time the index, the scoring rule, the search program, or the search target data is updated, which makes it possible to provide the search results using the corresponding one of the index, the scoring rule, the search program, and the search target data of an arbitrary time instant.

Further, each time the search processing is executed based on the search request, the snapshots of the index, the scoring rule, the search program, and the search target data may be obtained after completion of the search processing. As a result, the searcher is provided with the past search results again, and can be provided with another access to the data accessed in the past.

The index, the scoring rule, the search program, and the search target data may be stored in a single LU. In a similar manner, snapshots of the index, the scoring rule, the search program, and the search target data may also be stored in a single LU.

Further, the search target data, the index, the scoring rule, the search program, and their snapshots may be distributed to exist in different storage systems. For example, the search target data LU 0115 and the data snapshot LU group 0122 in which the snapshot of the search target data is stored may exist in a first storage system, the index LU 0116 and the index snapshot LU group 0118 in which the snapshot of the index is stored may exist in a second storage system, the scoring rule LU 0117 and the scoring rule snapshot LU group 0119 in which the snapshot of the scoring rule is stored may exist in a third storage system, and the search program LU 0120 and the search program snapshot LU group 0121 in which the snapshot of the search program is stored may exist in a fourth storage system. This embodiment can produce the same effect in a storage system employing a large-scale distribution.

Some search programs may not allow the creation of the snapshot of only the search program. For this case, there may be adopted an embodiment in which the snapshot to be created contains the search program and an execution environment (such as OS) therefor. In this case, the above-mentioned is used to launch a virtual machine on the search engine server 0103 by using the virtual server software, and the search program and its execution environment within the snapshot are caused to operate on the virtual machine.

In some implementations, the scoring rule and the search program may be integral and cannot be separated. In this case, when the snapshot of one of the scoring rule and the search program is created, the snapshot of the other is also created. When the scoring rule time is specified in the search, the snapshot to be used should also have the search program time specified with the same time.

Some scoring rules not only use static information, but may also use dynamic information that changes with the elapse of time, for example, the count of access to data and the last time of access to the data. For this case, there may be adopted an embodiment in which the snapshot to be created contains the dynamic information necessary for the score calculation as well as the scoring rule.

There may be adopted another embodiment in which a file server or a network attached storage (NAS) is used as the storage system. In this case, snapshots are created on a file basis or a file system basis. The other configuration components can be realized by the embodiments already described above.

While the present invention has been described in detail and pictorially in the accompanying drawings, the present invention is not limited to such detail but covers various obvious modifications and equivalent arrangements, which fall within the purview of the appended claims.

What is claimed is:

1. A retrieval system, comprising:

a storage system; and a search engine server coupled to the storage system, for retrieving a data object satisfying search criteria from among a plurality of data objects in accordance with a search request, wherein:

the storage system comprises:

a first logical unit for storing an index including a plurality of index records;

a second logical unit for storing a rule that defines how to output search results;

at least one third logical unit for storing a snapshot of the index; and at least one fourth logical unit for storing a snapshot of the rule;

each of the plurality of index records is created for any one of the plurality of data objects, and includes storage location information indicating where the data object is stored and a keyword list of at least one keyword included in the data object; and the search engine server is configured to:

select the third logical unit and the fourth logical unit based on a search request upon reception of the search request;

search the index stored in the selected third logical unit with a keyword included in the search request for an index record whose keyword list includes the keyword; and output the storage location information of the data object included in at least one extracted index record in an order according to the rule stored in the selected fourth logical unit, wherein the storage system further comprises:

a plurality of third logical units for storing snapshots of the index which are created based on times different from each other; and a plurality of fourth logical units for storing snapshots of the rule which are created based on times different from each other;

the search engine server is further configured to:
manage the snapshots of the index and the snapshot of the rule by associating each of the times based on which the snapshots are created with identification information of a logical unit storing the corresponding snapshot;
refer time information relating to the index and the rule included in the search request upon reception of the search request; and
select for the index the third logical unit that stores the snapshot of the index created based on a time before and closest to a time determined by the time information, and for the rule the fourth logical unit that stores the snapshot of the rule created based on a time before and closest to a time determined by the time information.

2. The retrieval system according to claim 1, wherein the search engine server is further configured to:
search the index stored in the first logical unit with the keyword included in the search request for the index record whose keyword list includes the keyword in a case of which the search request does not include the time information; and
output the storage location information of the data object included in at least one extracted index record in an order according to the rule stored in the second logical unit.

3. The retrieval system according to claim 1, wherein the storage system further comprises a plurality of unused logical units including a ninth logical unit and a tenth logical unit; and
the search engine server is further configured to:
select the ninth logical unit from the plurality of unused logical units and control to store the snapshot of the index by copying data from the first logical unit to the ninth logical unit; and
select the tenth logical unit from the plurality of unused logical units and control to store the snapshot of the rule by copying data from the second logical unit to the tenth logical unit.

4. The retrieval system according to claim 3, wherein the search engine server is further configured to:
control to store the snapshot of the index prior to the updating which is stored in the first logical unit upon updating of the index; and
control to store the snapshot of the rule prior to the updating which is stored in the second logical unit upon updating of the rule.

* * * * *